(12) United States Patent
Odell

(10) Patent No.: US 12,227,849 B2
(45) Date of Patent: Feb. 18, 2025

(54) COPPER-FOULING-RESISTANT STATOR WATER COOLING (SWC) SYSTEM AND METHOD

(71) Applicant: Exelon Generation Company, LLC, Kennett Square, PA (US)

(72) Inventor: Andrew Delano Odell, Kennett Square, PA (US)

(73) Assignee: Constellation Energy Generation, LLC, Kennett Square, PA (US)

( * ) Notice: Subject to any disclaimer, the term of this patent is extended or adjusted under 35 U.S.C. 154(b) by 303 days.

(21) Appl. No.: 17/242,953

(22) Filed: Apr. 28, 2021

(65) Prior Publication Data

US 2021/0336509 A1    Oct. 28, 2021

Related U.S. Application Data

(60) Provisional application No. 63/016,596, filed on Apr. 28, 2020.

(51) Int. Cl.
| | | |
|---|---|---|
| *C23C 18/16* | (2006.01) | |
| *C09D 5/16* | (2006.01) | |
| *B08B 17/02* | (2006.01) | |
| *C25D 7/00* | (2006.01) | |

(52) U.S. Cl.
CPC ............ *C23C 18/16* (2013.01); *C09D 5/1618* (2013.01); *B08B 17/02* (2013.01); *C23C 18/1637* (2013.01); *C23C 18/1644* (2013.01); *C25D 7/00* (2013.01)

(58) Field of Classification Search
CPC . C23C 18/16; C23C 18/1637; C23C 18/1644; C09D 5/1618; C25D 7/00; B08B 17/02

USPC ......................................................... 427/328
See application file for complete search history.

(56) References Cited

U.S. PATENT DOCUMENTS

| | | | | |
|---|---|---|---|---|
| 3,490,125 | A  * | 1/1970 | Frieling, Jr. ............. | H01B 7/14 428/685 |
| 6,459,750 | B1 * | 10/2002 | Itoo ........................... | C02F 1/42 376/402 |
| 9,394,618 | B1 * | 7/2016 | Bellows .................... | C23G 3/00 |
| 2002/0078975 | A1 * | 6/2002 | Rowe ....................... | C02F 5/083 134/22.12 |
| 2002/0117452 | A1 * | 8/2002 | Rowe ....................... | H02K 9/26 210/741 |
| 2005/0152869 | A1 * | 7/2005 | Weed ....................... | B63B 59/04 424/78.09 |
| 2010/0282612 | A1 * | 11/2010 | Tanaka ................... | C25D 7/006 205/210 |

(Continued)

FOREIGN PATENT DOCUMENTS

| | | | | | |
|---|---|---|---|---|---|
| JP | 09271156 | A  * | 10/1997 | ............. | F28F 19/06 |
| JP | 10262351 | A  * | 9/1998 | | |
| JP | 3860856 | B2 * | 12/2006 | ............. | F28F 19/06 |

*Primary Examiner* — Brian K Talbot
(74) *Attorney, Agent, or Firm* — Ballard Spahr LLP

(57) ABSTRACT

Described herein is a stator water cooling (SWC) system in an electrical power generator with improved resistance to copper fouling, more specifically, to a component of the SWC system, such as a strainer, having an anti-fouling metallic material on the surface of the component. Also described herein is a method of reducing copper fouling in a SWC system that comprises applying an anti-fouling metallic material to the surface of a SWC system component.

8 Claims, 8 Drawing Sheets

(56) References Cited

U.S. PATENT DOCUMENTS

| | | | |
|---|---|---|---|
| 2012/0031435 A1* | 2/2012 | Szakalos | H02K 9/26 |
| | | | 137/154 |
| 2014/0251504 A1* | 9/2014 | Xu | H02K 3/22 |
| | | | 118/58 |
| 2015/0259542 A1* | 9/2015 | Savin | B05D 7/14 |
| | | | 427/327 |
| 2016/0312591 A1* | 10/2016 | Pyron | F04D 13/062 |
| 2017/0223779 A1* | 8/2017 | Suetsugu | H01C 17/003 |
| 2018/0051179 A1* | 2/2018 | Katsumata | C09D 7/40 |
| 2019/0233660 A1* | 8/2019 | Brust | C09D 7/67 |

\* cited by examiner

COPPER-FOULING-RESISTANT STATOR WATER COOLING (SWC) SYSTEM AND METHOD

CROSS-REFERENCE TO RELATED APPLICATIONS

This application claims the benefit of U.S. Provisional Application No. 63/016,596, filed Apr. 28, 2020, which is incorporated by reference in its entirety.

FIELD

This invention relates generally to a stator water cooling (SWC) system in an electrical power generator with improved resistance to copper fouling, more specifically, to a component of the SWC system, such as a strainer, having an anti-fouling metallic material on the surface of the component.

BACKGROUND

Industrial electrical power generators typically have an internal liquid cooling system for cooling stators. The internal liquid cooling system is referred to as a stator water cooling (SWC) system. Stator coolant, typically water, circulates through the SWC system to cool the windings in the stator. The coolant removes heat from the stator windings generated by high-energy electric current.

The SWC system includes a network of cooling passages throughout the stator that extend between the windings. These cooling passages should remain open and free of obstructions to ensure a high flow of coolant to all sections of the stator. To ensure a continuous flow of coolant, the SWC system includes one or more strainers and filters to remove debris and other particles that become suspended in the coolant. If not removed, debris and particles tend to clog and obstruct the cooling passages of the SWC system. A strainer or filter can capture debris and particles as coolant flows through the strainer or filter, keeping cooling passages open.

A common problem encountered with SWC systems is the deposition of a copper oxide, typically cuprous oxide ($Cu_2O$) or copper oxide (CuO), onto one or more elements of the SWC system, particularly the strainer or filter. To control heating of stators as high-density electric current passes through them, stators are typically constructed of a network of stator strands in which hollow copper conductors are placed. The copper conductors are used for circulating coolant. As coolant circulates through the copper conductors, a layer of a copper oxide can form on the internal surface of the conductor. The resulting copper oxide has a tendency to release into the coolant under various conditions and ultimately redeposit onto elements of the SWC system, including the filter or strainer. As the copper oxide builds up on the filter or strainer, coolant flow to the generator is impeded, which can ultimately cause the generator to overheat or fail.

Various solutions have been developed to address the problem of copper fouling in a SWC system. Many of these solutions involve taking the SWC system (and the generator) offline to clean copper oxide deposits from SWC system elements. A need exists for an approach that does not require extended down-time of the generator. This need and others are satisfied by the present invention.

SUMMARY

Disclosed herein, in one aspect, is an electrical power generator comprising a stator water cooling (SWC) system that comprises one or more copper conductors and a SWC system strainer comprising an anti-fouling metallic material on the surface of the SWC system strainer.

Also disclosed herein, in a further aspect, is a method of reducing copper fouling in a stator water cooling (SWC) system, the method comprising identifying a component of the SWC system that is susceptible to fouling by a copper oxide, and applying an anti-fouling metallic material to the surface of the component.

Also disclosed herein, in a still further aspect, is a fouling-resistant component of a stator water cooling (SWC) system prepared by a disclosed method.

Additional advantages of the disclosed system and method will be set forth in part in the description which follows, and in part will be understood from the description, or may be learned by practice of the disclosed system and method. The advantages of the disclosed system and method will be realized and attained by means of the elements and combinations particularly pointed out in the appended claims. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the disclosed system and method and together with the description, serve to explain the principles of the disclosed system and method.

DETAILED DESCRIPTION

Figure 1:
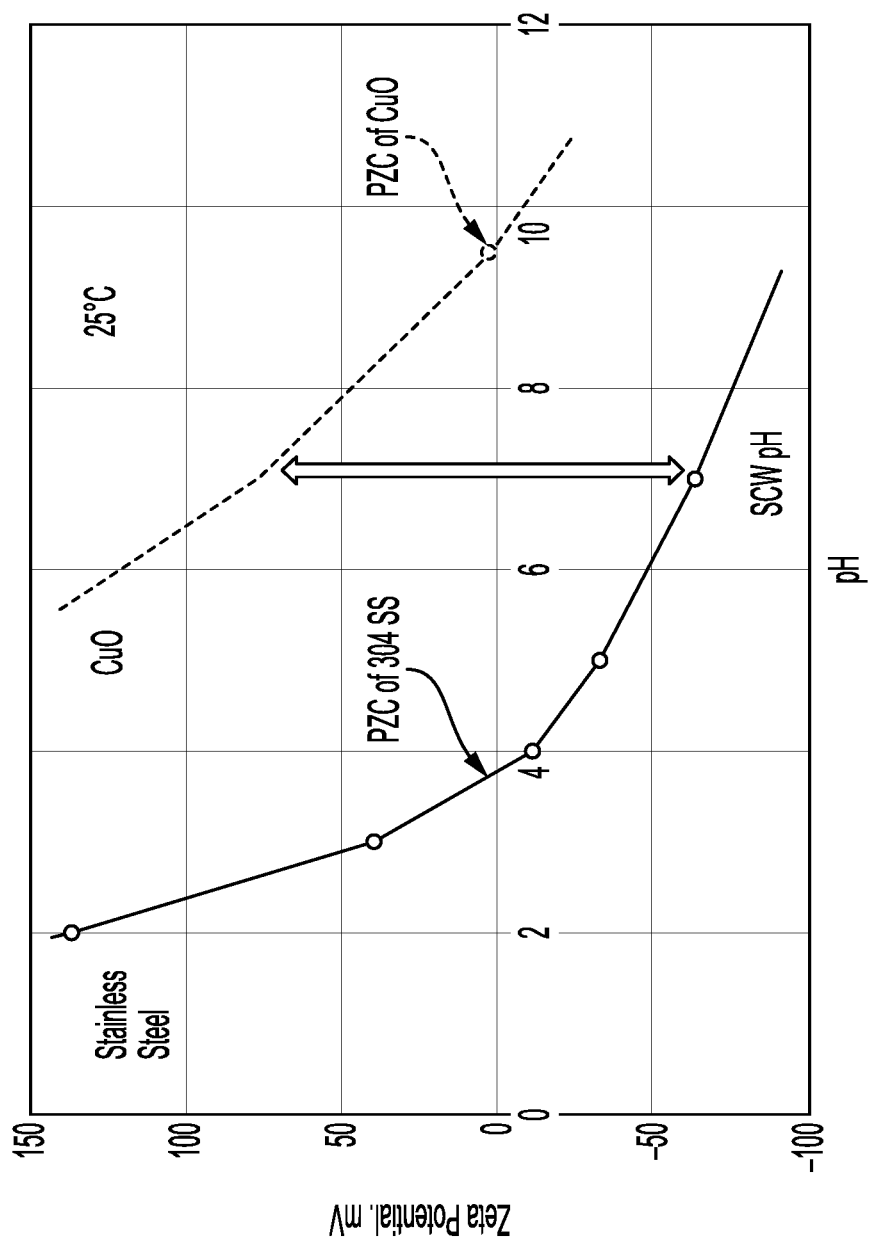
FIG. 1 shows a plot of zeta potential versus pH at 25° C. for 304 stainless steel, a common stainless steel used in SWC system strainers, alongside a projected zeta potential of CuO.

The disclosed system and method may be understood more readily by reference to the following detailed description of particular embodiments and the examples included therein and to the Figures and their previous and following description.

A. Definitions

It is to be understood that the terminology used herein is for the purpose of describing particular embodiments only, and is not intended to limit the scope of the present invention which will be limited only by the appended claims.

It must be noted that as used herein and in the appended claims, the singular forms "a," "an," and "the" include plural references unless the context clearly dictates otherwise. Thus, for example, reference to "a sanitization chamber" includes a plurality of such chambers, and reference to "the sanitization chamber" is a reference to one or chambers and equivalents thereof known to those skilled in the art, and so forth.

"Optional" or "optionally" means that the subsequently described event, circumstance, or material may or may not occur or be present, and that the description includes instances where the event, circumstance, or material occurs or is present and instances where it does not occur or is not present.

Ranges may be expressed herein as from "about" one particular value, and/or to "about" another particular value. When such a range is expressed, also specifically contemplated and considered disclosed is the range from the one particular value and/or to the other particular value unless the context specifically indicates otherwise. Similarly, when values are expressed as approximations, by use of the antecedent "about," it will be understood that the particular value forms another, specifically contemplated embodiment that should be considered disclosed unless the context specifically indicates otherwise. It will be further understood that the endpoints of each of the ranges are significant both in relation to the other endpoint, and independently of the other endpoint unless the context specifically indicates otherwise. Finally, it should be understood that all of the individual values and sub-ranges of values contained within an explicitly disclosed range are also specifically contemplated and should be considered disclosed unless the context specifically indicates otherwise. The foregoing applies regardless of whether in particular cases some or all of these embodiments are explicitly disclosed.

Optionally, in some aspects, when values are approximated by use of the antecedents "about," "substantially," or "generally," it is contemplated that values within up to 15%, up to 10%, up to 5%, or up to 1% (above or below) of the particularly stated value or characteristic can be included within the scope of those aspects.

Unless defined otherwise, all technical and scientific terms used herein have the same meanings as commonly understood by one of skill in the art to which the disclosed device and method belong. Although any device and method similar or equivalent to those described herein can be used in the practice or testing of the present device and method, the particularly useful devices and methods are as described.

Throughout the description and claims of this specification, the word "comprise" and variations of the word, such as "comprising" and "comprises," means "including but not limited to," and is not intended to exclude, for example, other elements, components, integers or steps. In particular, in methods stated as comprising one or more steps or operations, it is specifically contemplated that each step comprises what is listed (unless that step includes a limiting term such as "consisting of"), meaning that each step is not intended to exclude, for example, other elements, components, integers or steps that are not listed in the step.

Various publications are referenced. The disclosures of these publications in their entireties are hereby incorporated by reference into this application in order to more fully describe the state of the art to which this pertains. The references disclosed are also individually and specifically incorporated by reference for the material contained in them that is discussed in the sentence in which the reference is relied upon. Nothing herein is to be construed as an admission that the present invention is not entitled to antedate such publication by virtue of prior invention. Further, the dates of publication provided herein may be different from the actual publication dates, which can require independent confirmation.

B. Stator Water Cooling (SWC) System

Disclosed herein, in one aspect, is an electrical power generator comprising a stator water cooling (SWC) system that comprises one or more copper conductors and a SWC system strainer comprising an anti-fouling metallic material on the surface thereof.

In a further aspect, the zeta potential of the anti-fouling metallic material has the same sign as the zeta potential of a fouling copper oxide that forms on the one or more copper conductors during operation of the electrical power generator, at a SWC system operating pH and temperature. In one aspect, the fouling copper oxide can be copper oxide (CuO), cuprous oxide ($Cu_2O$), or a combination thereof. A SWC system typically operates at a temperature of about 140° F. and close to neutral pH (i.e., close to pH 7), but operating conditions can vary. Without wishing to be bound by theory, it is believed that copper-fouling of SWC system components occurs because the zeta potential of fouling copper oxides at these operating conditions has the opposite sign of the zeta potential of SWC system components, e.g., a stainless steel strainer.

FIG. 1, for example, shows a plot of zeta potential versus pH at 25° C. for 304 stainless steel, a common stainless steel used in SWC system strainers, alongside a projected zeta potential of CuO. The zeta potentials for CuO were projected based on piezoelectric data for CuO and a piezoelectric constant (pzc) of 9.5. See G. A. Parks, Chemical Review, Vol 65, Page 177 (1965). As shown in FIG. 1, at a SWC system operating pH of about 7, the zeta potential of 304 stainless steel is negative, and the zeta potential of CuO is positive. As a result, a strong electrostatic interaction between the stainless steel and CuO will occur under these conditions, which is believed to result in CuO deposition onto the surface of the stainless steel. This electrostatic interaction can be minimized or eliminated through the use of an anti-fouling metallic material on the surface of SWC system components that has the same sign zeta potential as that of a fouling copper oxide that forms during operation of the electrical power generator.

Figure 2:
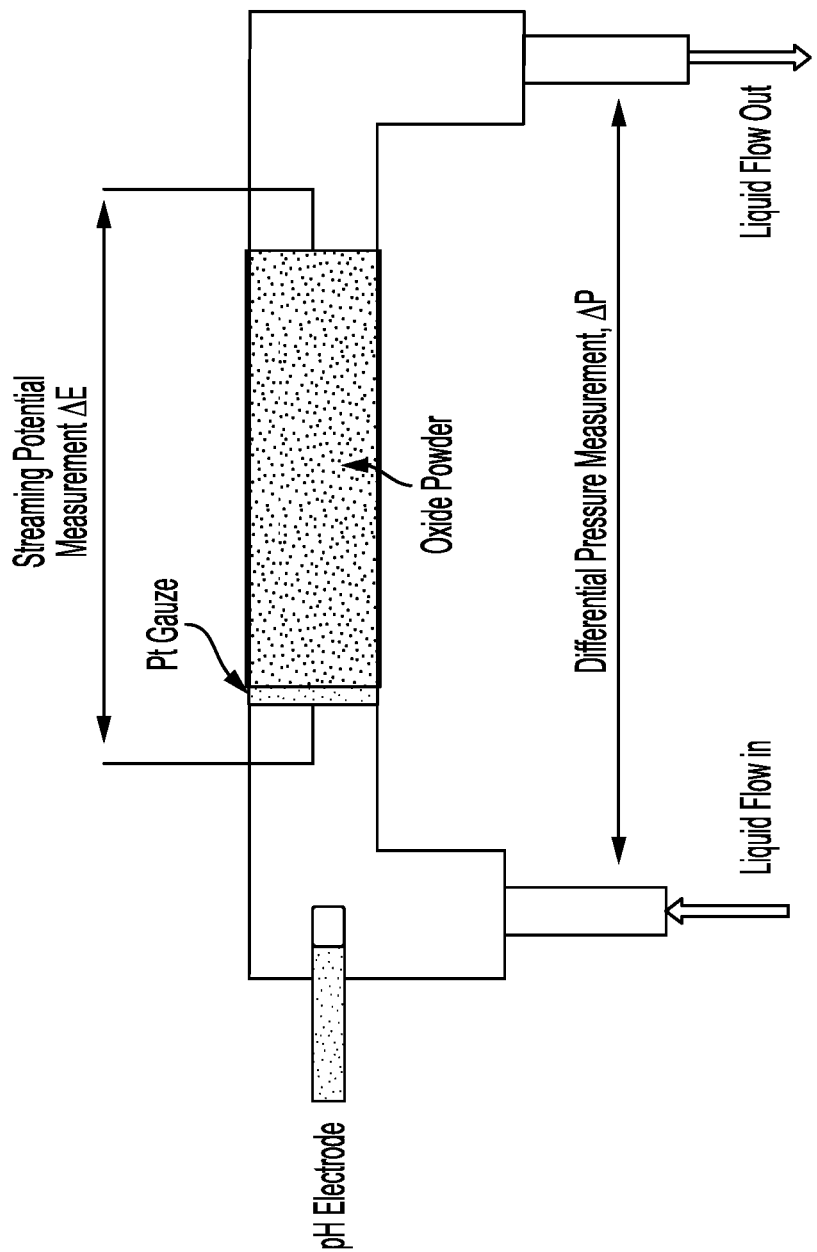
FIG. 2 depicts an arrangement of a streaming potential cell that can be used to measure streaming potential, from which zeta potentials can be deduced.

Zeta potentials of a fouling copper oxide that forms during operation of an electrical power generator and the anti-fouling metallic material can be determined using methods known in the art. With reference to FIG. 2, for example, zeta potentials can be deduced from streaming potential measurements. A streaming potential cell such as that depicted in FIG. 2 includes a hollow tube containing packed powder that allows liquid electrolyte flow under an applied differential pressure ($\Delta P$) across the tube ends. Streaming potential ($\Delta E$) is measured across platinum gauze electrodes at either end, as shown in FIG. 2. In place of an oxide powder, such as CuO powder, metal capillaries can be used to measure streaming potentials of metallic materials, including the anti-fouling metallic materials disclosed herein. See R. M. Hurd and N. Hackerman, J. Electrochem. Soc., 103, 316 (1956).

The surface charge density of a material (e.g., an oxide particle or an anti-fouling metallic material) results in a zeta potential, which is related to the streaming potential ($\Delta E$) by the following equation:

$$\Delta E = E_{streaming} = \varepsilon_o \varepsilon \Delta P \zeta / 4\pi \eta k_o,$$

where $\varepsilon_o$ is the permittivity of free space, $\varepsilon$ is the dielectric constant of water, $\Delta P$ is the differential pressure across the flow path, $\zeta$ is the zeta potential, $\eta$ is the viscosity of water, and $k_o$ is the conductivity of the flow path. See R. J. Hunter, Zeta Potential in Colloid Science, Academic Press, San Diego, California, USA (1988); R. J. Kuo and E. Matijevic, J. Colloid Interfacial Science, 78, 407 (1980). Thus, zeta potentials can be obtained from a measurement of the streaming potential at a given solution pH and temperature using the above equation. Zeta potentials can also be determined from the slope of a $\Delta E$ versus $\Delta P$. See P. Jayaweera et al., EPRI Report TR-101256, EPRI, Palo Alto, California, October (1992).

Selection of the anti-fouling metallic material can also be made based on piezoelectric constant (pzc) or isoelectric point data. The piezoelectric constant (pzc) or isoelectric point is the pH at which a suspended material has a zero net surface charge. By matching the anti-fouling metallic material to the fouling copper oxide based on the piezoelectric constants (pzc) or isoelectric points of the metallic material and the oxide, the signs of the zeta potentials at SWC system operating conditions can be aligned to the same sign, thus reducing or eliminating oxide fouling.

Thus, in one aspect, the anti-fouling metallic material has a piezoelectric constant (pzc) or isoelectric point that is close to that of a fouling copper oxide that forms during operation of the electrical power generator. In a further aspect, the anti-fouling metallic material has an isoelectric point no less than 1.5 pH units lower than a fouling copper oxide that forms on the one or more copper conductors during operation of the electrical power generator. For example, assuming a piezoelectric constant (pzc) or isoelectric point of 9.5 for CuO, a suitable anti-fouling metallic material can have a corresponding piezoelectric constant (pzc) or isoelectric point of 8 or greater, according to one aspect.

Non-limiting examples of suitable anti-fouling metallic materials are those that comprise Zn, Al, Cu, Ni, Cd, or a combination or alloy thereof. Examples of such materials include without limitation ZnO, $Al_2O_3$, CuO, NiO, CdO, or a combination or alloy thereof. In one aspect, the anti-fouling metallic material comprises Zn, Cu, Ni, or a combination or alloy thereof, for example, ZnO, CuO, NiO, or a combination or alloy thereof. In a further aspect, the anti-fouling metallic material comprises Monel (Ni/Cu alloy), Brass (Zn/Cu alloy), Cupronickel (Cu/Ni alloy), or a combination thereof.

Piezoelectric constants (pzc) or isoelectric points of some of the exemplary anti-fouling metallic materials are shown in Table 1. See G. A. Parks, Chemical Review, Vol 65, Page 177 (1965).

TABLE 1

Isoelectric Points (pzc) of Exemplary Anti-Fouling Metallic Materials.

| Material | Isoelectric Point (pzc) |
|---|---|
| CdO | 10.4 |
| NiO | 10.3 |
| CuO | 9.5 |
| $Al_2O_3$ | 9.1-9.2 |
| ZnO | 9.2 |

As shown, for example, the piezoelectric constant (pzc) or isoelectric point of the anti-fouling metallic material can be close to that of a fouling copper oxide (e.g., CuO, which has a pzc of 9.5) that forms during operation of the electrical power generator.

Figure 3:
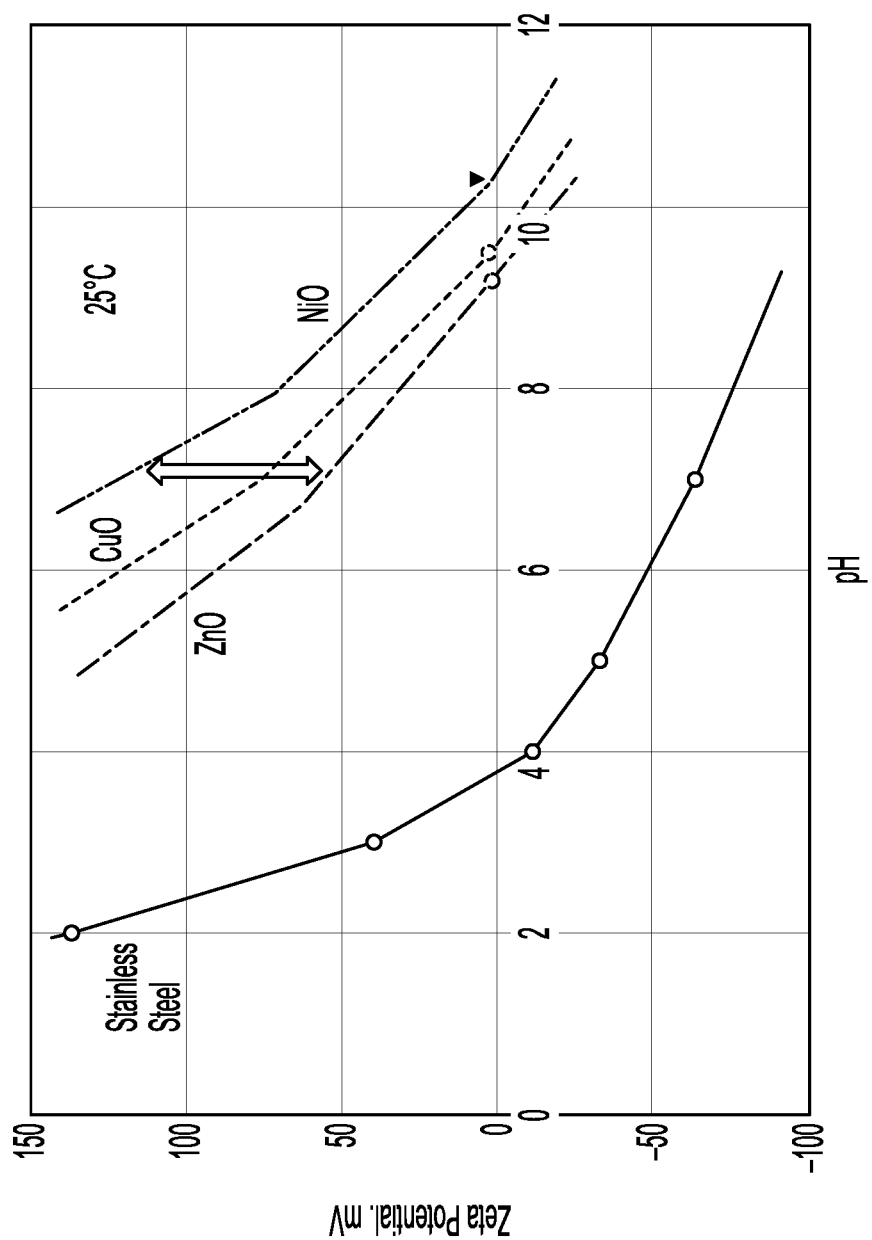
FIG. 3 shows a plot of zeta potential versus pH at 25° C. for 304 stainless steel, ZnO, CuO, and NiO.

Similarly, as described above, the anti-fouling metallic material can be selected based on zeta potentials determined, for example, through streaming potential measurements or extrapolated from piezoelectric constant (pzc) or isoelectric point data. FIG. 3, for example, shows a plot of zeta potentials versus pH for stainless steel, ZnO, CuO, and NiO. As shown in FIG. 3, the zeta potentials of ZnO, CuO, and NiO have the same sign as that of a fouling copper oxide at a SWC operating pH of around 7.

When the anti-fouling metallic material comprises CuO, it is understood that the CuO constituting the anti-fouling metallic material is different than any fouling CuO that forms during operation of the generator. For example, a SWC system component having an anti-fouling coating of CuO on the surface thereof is not a fouled system component formed during operation of the generator. Thus, in one aspect, when the anti-fouling metallic material comprises CuO, the CuO is not CuO formed on the copper conductors and released into the coolant during operation of the electrical power generator.

Figure 4:
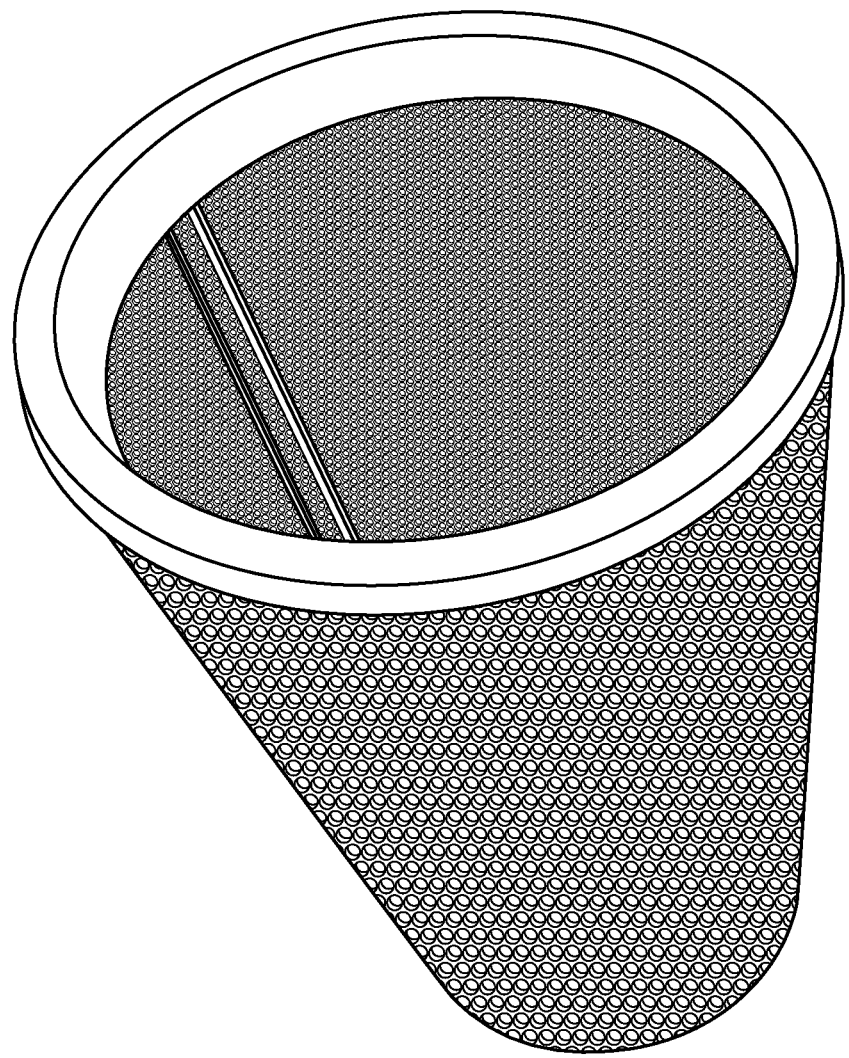
FIG. 4 is a photograph of an exemplary stainless steel SWC system strainer.

A variety of SWC system components can comprise the anti-fouling metallic material. Examples of such components include a SWC system filter and a SWC system strainer. Typical SWC filters have a pore size in the range of about 1 μm to about 20 μm. Typical stainless steel strainers usually have a mesh opening size of about 15 μm to 100 μm. An exemplary stainless steel SWC system strainer is shown in the photograph of FIG. 4.

According to one aspect, the anti-fouling metallic material is applied onto the surface of a SWC system component, such as a strainer or filter. The anti-fouling metallic material can be applied to the surface of a SWC system component using methods known the art, including without limitation chemical vapor deposition ("CVD"), thermal spray coating by plasma or high-velocity oxygen fuel (HVOF), wire arc, physical vapor deposition (PVD), radio-frequency (RF) sputtering, electroplating, and electrolessplating. Thus, in one aspect, a stainless steel SWC system strainer comprises the anti-fouling metallic material applied to, coated, or plated onto the stainless steel surface of the SWC system strainer.

When the anti-fouling metallic material is applied to the surface of a SWC system component, the thickness of the metallic material can vary depending on the type SWC system component. In general, for a strainer or filter, the anti-fouling metallic material should have a thickness suitable for covering the surface of the strainer or filter but not so thick as to occlude the mesh or pore openings of the strainer or filter. For example, a suitable treatment can apply a conformal surface coating including a coating on mesh openings or pores of the metallic, e.g., stainless steel, components of the SWC system, without occluding the mesh openings or pores.

According to one aspect, the thickness of the anti-fouling metallic material can be from about 0.1 microns to about 300 microns. In a further aspect, the anti-fouling metallic material has a thickness of from about 10 μm to about 100 μm. For example, the anti-fouling metallic material can have a thickness of about 10 μm, 15 μm, 20 μm, 25 μm, 40 μm, 50 μm, 60 μm, 70 μm, 80 μm, 90 μm, or 100 μm. In one aspect, the anti-fouling metallic material conforms to the surface of the SWC system component, e.g., a stainless steel strainer, such that the anti-fouling metallic material covers substantially all or all of the exterior surface of the SWC system component.

C. Method for Reducing Copper Fouling in a Stator Water Cooling (SWC) System Also disclosed herein, in a further aspect, is a method of reducing copper fouling in a stator water cooling (SWC) system, the method comprising (a) identifying a component of the SWC system that is susceptible to fouling by a copper oxide; and (b) applying an anti-fouling metallic material to the surface of the component to reduce copper fouling of the component. The method can be used with the disclosed stator water (SWC) system but may also be used with other systems and components.

In one aspect, the method comprises applying an anti-fouling metallic material to the surface of a SWC component that has a zeta potential of the same sign as the zeta potential of a fouling copper oxide that forms during operation of the electrical power generator, e.g., copper oxide (CuO) or cuprous oxide ($Cu_2O$). Various SWC system components can be used with the method, including without limitation a SWC system filter or strainer, including a SWC system strainer comprising stainless steel.

The anti-fouling metallic material can be selected as discussed above, e.g., through measuring streaming potentials of the metallic material to arrive at zeta potentials, or by correlating zeta potentials to known or measured piezoelectric constant (pzc) or isoelectric point data. Thus, as described above, anti-fouling metallic materials suitable for use with the method include metallic materials that comprise Zn, Al, Cu, Ni, Cd, or a combination or alloy thereof. Examples of such materials include without limitation ZnO, $Al_2O_3$, CuO, NiO, CdO, or a combination or alloy thereof. In one aspect, the anti-fouling metallic material comprises Zn, Cu, Ni, or a combination or alloy thereof, for example, ZnO, CuO, NiO, or a combination or alloy thereof. In a further aspect, the anti-fouling metallic material comprises Monel (Ni/Cu alloy), Brass (Zn/Cu alloy), Cupronickel (Cu/Ni alloy), or a combination thereof.

According to one aspect, the anti-fouling metallic material is applied onto the surface of a SWC system component, such as a strainer or filter. The anti-fouling metallic material can be applied to the surface of a SWC system component using methods known the art, including without limitation chemical vapor deposition ("CVD"), thermal spray coating by plasma or high-velocity oxygen fuel (HVOF), wire arc, physical vapor deposition (PVD), radio-frequency (RF) sputtering, electroplating, and electrolessplating. Thus, in one aspect, a stainless steel SWC system strainer comprises the anti-fouling metallic material applied to, coated, or plated onto the stainless steel surface of the SWC system strainer.

According to one aspect, the thickness of the anti-fouling metallic material applied to the SWC system component can be from about 0.1 microns to about 300 microns. In a further aspect, the anti-fouling metallic material has a thickness of from about 10 μm to about 100 μm. For example, the anti-fouling metallic material can have a thickness of about 10 μm, 15 μm, 20 μm, 25 μm, 40 μm, 50 μm, 60 μm, 70 μm, 80 μm, 90 μm, or 100 μm. In one aspect, the anti-fouling metallic material conforms to the surface of the SWC system component, e.g., a stainless steel strainer, such that the anti-fouling metallic material covers substantially all or all of the exterior surface of the SWC system component.

Also disclosed herein, in a further aspect, is a fouling-resistant component of SWC system prepared by the disclosed method. Suitable components that can be made fouling-resistant include without limitation a SWC filter or strainer, including a SWC strainer comprising stainless steel.

Figure 7:
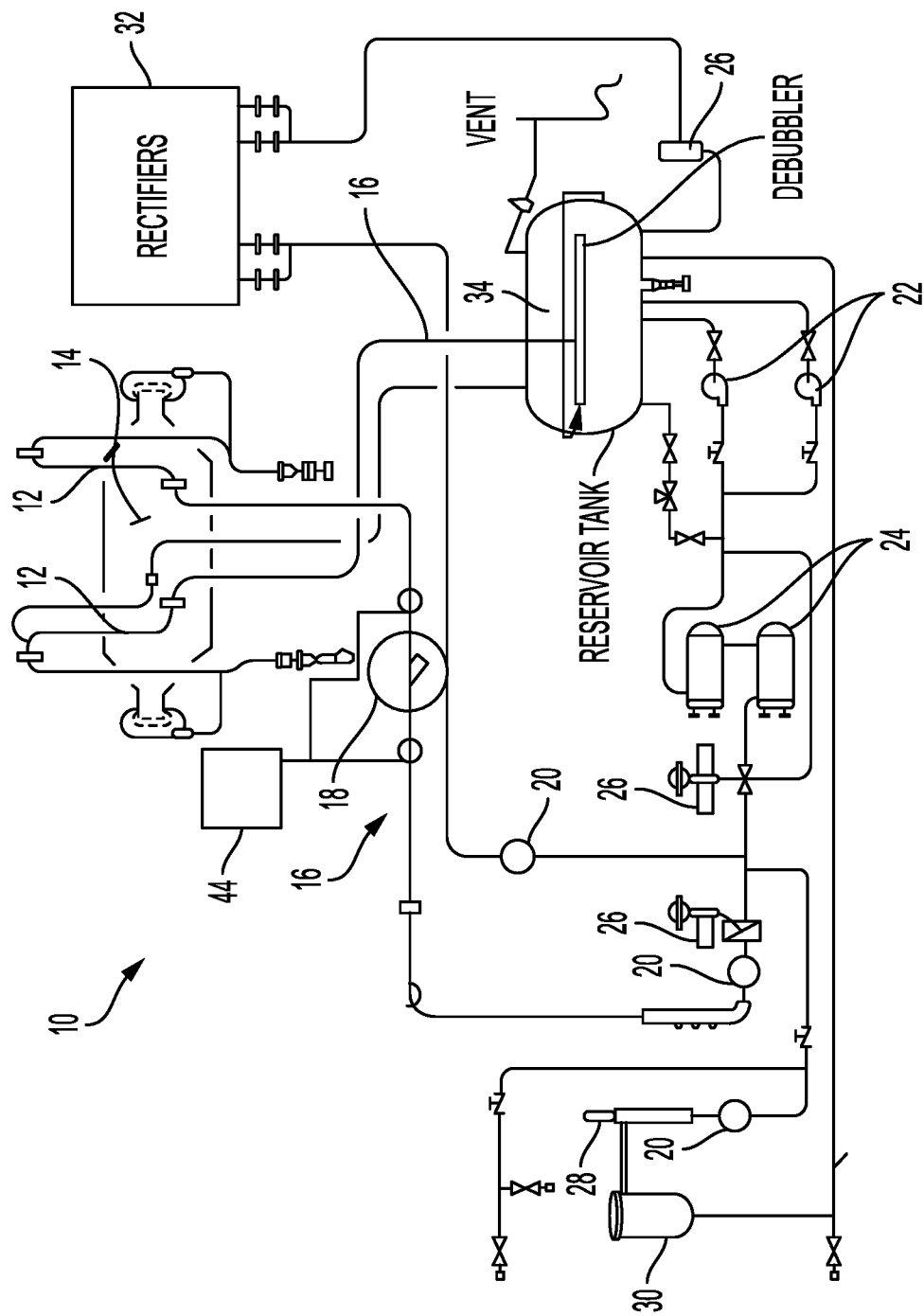
FIG. 7 shows a schematic of an exemplary SWC system in an electrical power generator.

FIG. 7 shows a schematic diagram of an exemplary SWC system 10 in an electrical power generator 14. The SWC system 10 circulates a suitable coolant through cooling conduits 12 of the stator of generator 14. SWC system 10 includes piping 16 that is external to generator 14 that is suitable for carrying the coolant through a network that includes SWC strainer 18. The network can also include in some aspects other filters 20, pumps 22, heat exchangers 24, flow controllers 26, coolant flow meters 28, a deionizer bed 30, rectifiers 32, and coolant reservoir tank 34.

In the embodiment shown in FIG. 7, coolant continually circulates through the SWC system network, including through strainer 18. Coolant can be drawn from reservoir tank 34 by stator water pumps 22, which then can flow into one or more heat exchangers 24 which cools the fluid. The cooled fluid from heat exchangers 24 flows through filters 20 and SCW strainer 18 and into the stator cooling conduits of generator 14. As coolant flows over copper windings, the coolant removes heat from the stator and the windings. Heat is carried by the coolant out of generator 14 and into reservoir 34.

In some aspects, electrical charge accumulated by the coolant as it passes through the electrically-charged passages in the stator is discharged as the coolant is circulated through rectifiers 32. Optionally, in some aspects, the coolant can be deionized in deionizing bed 30 to reduce the tendency of fouling metal oxides to form in the coolant. In some aspects, the flow rate of the coolant can be controlled by flow control valves 26 and monitored by flow meters 28 to provide a feedback control for controller 44 that operates control valves 26. By applying an anti-fouling material to a surface of strainer 18 or other components of the SCW system that are prone to fouling, as described herein, fouling of the strainer or other components can be reduced or minimized. In some aspects, components that can benefit from the anti-fouling material include strainer 18, filters 20, pumps 22, heat exchangers 24, among other components of a SCW system that are prone to fouling.

Figure 8:
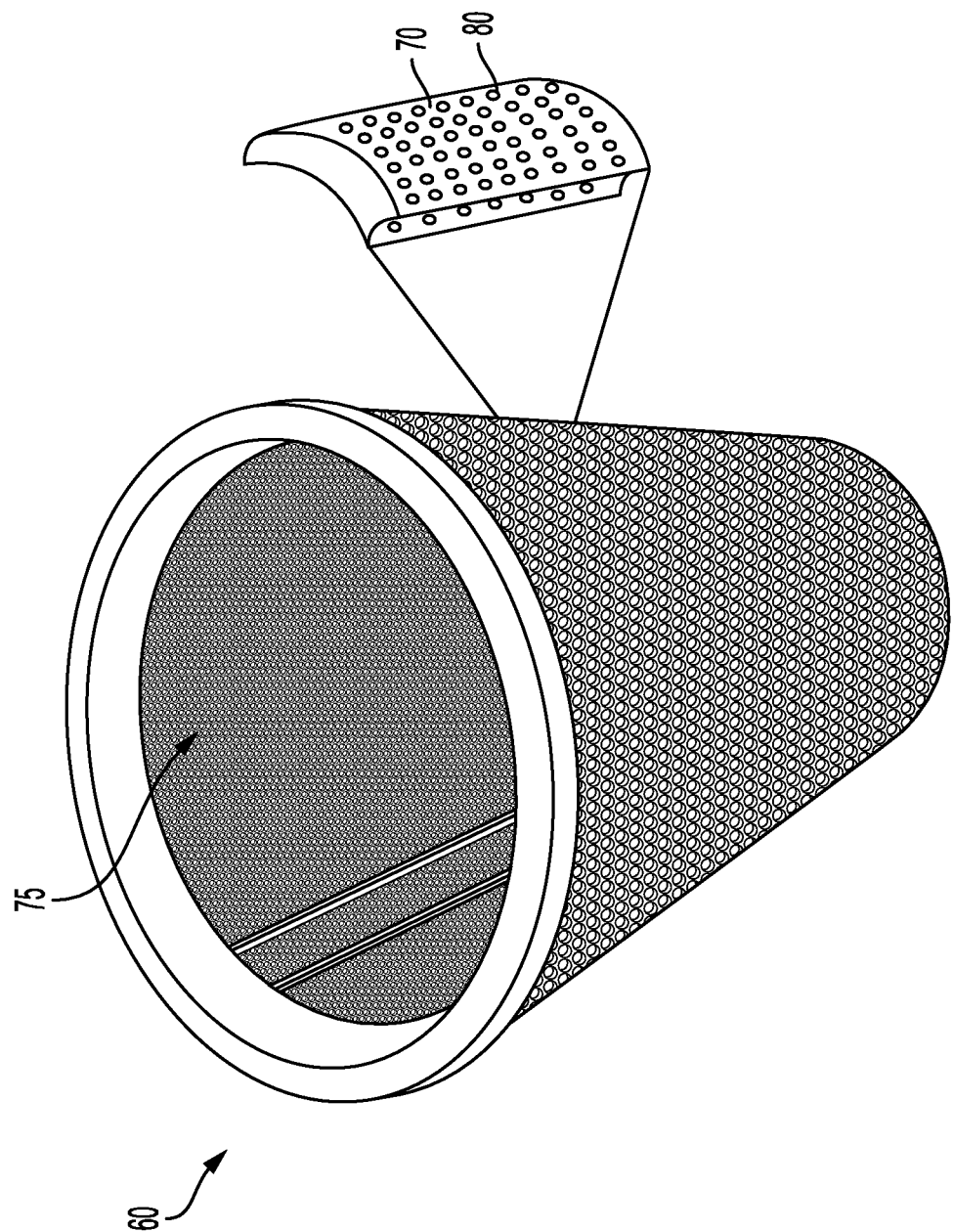
FIG. 8 is the photograph of an exemplary stainless steel SWC system strainer shown in FIG. 4 with an exploded diagram of a cross-sectional cut out of the wall of the SWC system strainer.

FIG. 8 shows the photograph of the SCW system strainer shown in FIG. 4 with an exploded cut out cross-sectional view of the wall of the SWC system strainer. Referring to the exploded cross-sectional view of the wall of SWC system strainer 60, a typical SCW system strainer includes a body portion 70 that defines an interior cavity 75 and that further defines a plurality of perforations or openings 80. In some aspects, coolant used in the SCW system passes through the plurality of perforations 80 while SWC system strainer 60 captures particulates in the coolant. Body portion 70 can comprise the anti-fouling coating described herein on at least a portion (or all) of the surface thereof, which can prevent the deposition of fouling metal oxides present in the coolant as the coolant passes through SCW system strainer 60.

While the exemplary embodiment depicted in FIG. 8 is a mesh-type SCW system strainer, any conventional SCW system strainer that functionally allows fluid such as coolant to pass through while capturing particulates in the fluid can be used. Thus, the SCW system strainer can comprise mesh openings, screen openings, perforations, and the like, of any suitable size used in SCW systems. In some aspects, the entire surface of body portion 70 can comprise the anti-fouling material. The thickness of the anti-fouling material on body portion 70 can vary within wide limits as described above. Strainer 60 can in some aspects include an exterior casing as one of skill in the art will recognize. Strainer 60 can be an in-line (as depicted in FIG. 7) or a strainer in another suitable configuration within the SCW system of an electrical power generator.

D. Examples

The following examples are put forth so as to provide those of ordinary skill in the art with a complete disclosure and description of how the systems claimed herein are made and evaluated, and are intended to be purely exemplary and are not intended to limit the scope of what the inventor regards as his invention. Efforts have been made to ensure accuracy with respect to numbers, but some errors and deviations should be accounted for. Unless indicated otherwise, parts are parts by weight, temperature is in ° F. or is at ambient temperature, and pressure is at or near atmospheric. The Examples are provided herein to illustrate the invention, and should not be construed as limiting the invention in any way.

Plant data from high dissolved oxygen (DO) SCW systems indicate that the measured copper is predominantly non-filterable (passes through a membrane filter). However, under high DO conditions, the predominant copper form is insoluble, which suggests the presence of fine (colloidal) copper oxide particles. The copper form (e.g., CuO) in plant SCW system samples has not been characterized in the literature. SCW liquid pH values, which are infrequently measured, are typically near 7, with some lower reported values likely due to carbon dioxide dissolution and ionization from high air inleakage.

Due to the lack of zeta potential data for copper oxide over the pH and potential range of interest for high DO SCW systems, laboratory zeta potential measurements were performed. The objective of these measurements was to provide data that can be used as the basis for selecting alternative materials of construction for SCW strainers that will resist fouling (plugging) that has been caused by copper oxide deposition on the oxide film that forms on the stainless steel wire mesh media.

There are several possible chemical and physical processes and interactions that can affect fouling. These include e.g. Van der Waals forces, electrostatic forces, thermohydraulic effects, and precipitation. The origin of electrostatic properties of a particle is connected to the electrical double layer properties of the particle surface. One way of getting experimental data of the electrical double layer is measuring the zeta potential. Usually only a very thin layer of fluid adheres to a surface. This layer is called the hydrodynamically stagnant layer. Despite its motionless nature, the stagnant layer can conduct charges. The border between the hydrodynamically stagnant layer and the bulk solution is called the hydrodynamic slip plane (slip plane, shear plane, surface of shear, shear boundary). The potential at the slip plane is called zeta potential potential). The zeta potential depends on the water chemistry (e.g., pH and oxygen content) and the temperature of the solution.

Zeta potentials of hematite ($Fe_2O_3$) (benchmark material), cupric oxide (CuO), and nickel oxide (NiO) powders were measured as a function of pH (T=50° C./122° F.). NiO was included in the oxides for zeta potential measurements based on the use of Monel (Cu/Ni alloy) as an alternative SCW strainer construction material. The Monel surface includes CuO and NiO in the surface oxide layer.

Materials and Methods.

Measurement solutions: laboratory deionized water, conductivity~0.1 µS/cm (controlled by adding $KNO_3$. pH was altered by NaOH and $HNO_3$. Oxygen content of the solutions: 4 ppm. Oxide powders: $Fe_2O_3$ (≥96%, Sigma-Aldrich); CuO (99.995%, Sigma-Aldrich); NiO (≥99.998%, PURATRONIC, Alfa Aesar). $Fe_2O_3$ powder was sieved with 75 µm stainless steel sieve and CuO and NiO powders with 25 µm SS sieve. The size distribution of the particles was measured by laser diffraction particle size analyzer Mastersizer 3000 by Malvern Panalytical. Zeta potential measurements were performed using a Zetasizer Nano ZS (ZEN3600) instrument by Malvern Panalytical. Zetasizer measures zeta potential by determining electrophoretic mobility by performing an electrophoresis experiment on the sample and measuring the velocity of the particles by using Laser Doppler Velocimetry.

Zeta potential measurements were made at T=50° C. (122° F.). The sample was allowed to stabilize at that temperature for at least 200 seconds before the start of the measurements. The instrument determined the electrophoretic mobility of the sample in the automatic mode 10-50 times and the results were used to calculate the average zeta potential. This was repeated 3 times for each sample. Repetitions with different samples at each pH were made until a stable zeta potential value was obtained. This process was repeated over several (6-12) days, making up new solutions each day. The total number of repetitions at each pH was roughly 20-40.

Figure 5:
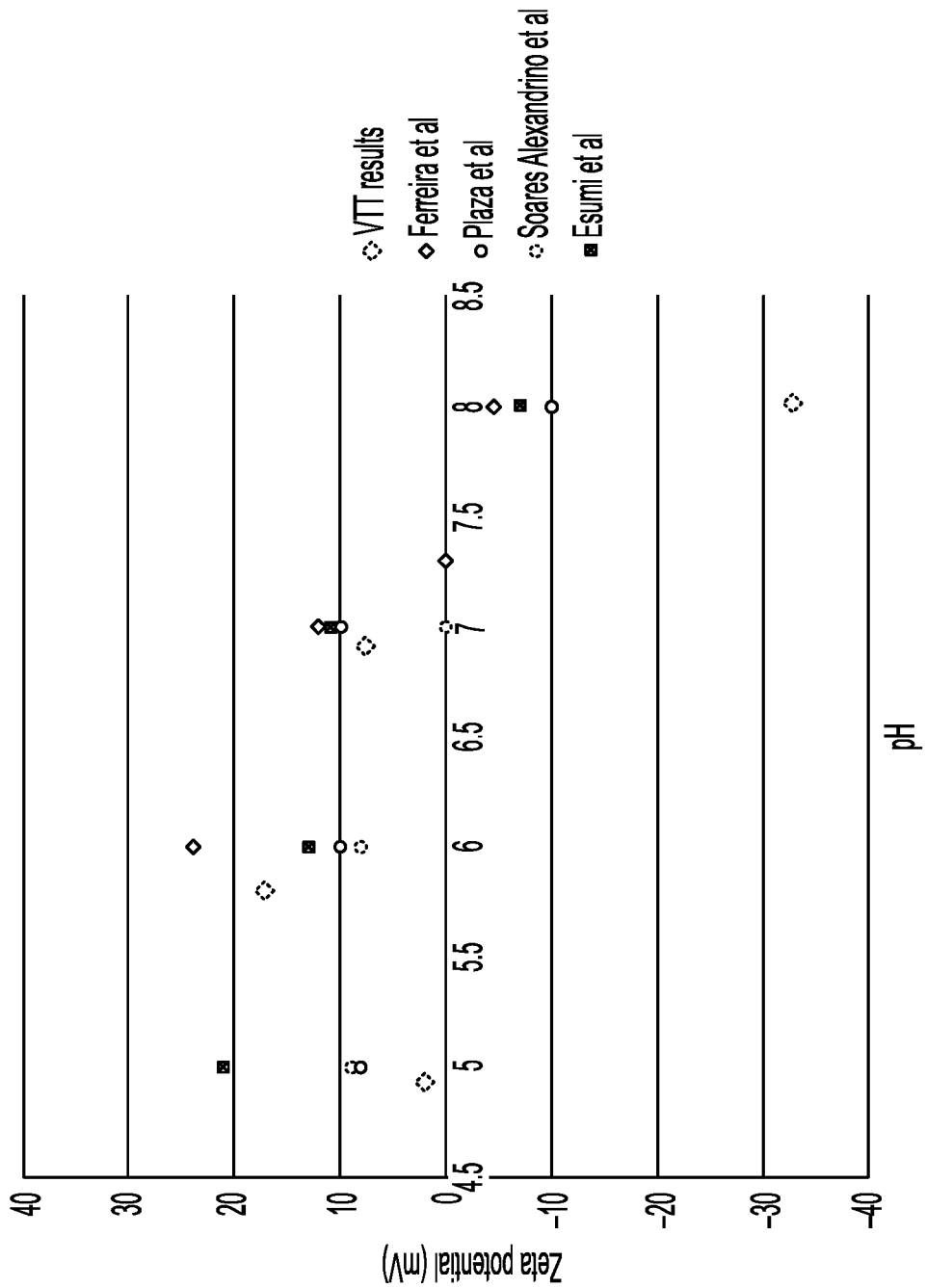
FIG. 5 shows a plot of zeta potential measurements vs. pH for Hematite.

Hematite ($Fe_2O_3$):

The zeta potential of hematite was measured as a benchmark to validate the methods used. Results presented in FIG. 5 show agreement between the laboratory measurements and published values in the technical literature. Ferreira, E. E et. al., "Zeta Potential Measurements using the Electroacoustic Method for Quartz and Hematite," Federal University of Minas Gerais, Brazil, 2001; R. C. Plaza et. al., "Electrical surface charge and potential of hematite/yttrium oxide core-shell colloidal particles," Colloid Polym Sci 279:1206-1211 (2001); Junia Soares Alejandrino et. al., "Dispersion degree and zeta potential of hematite," R. Esc. Minas, Ouro Preto, 69(2), 193-198, April June, 2016; Kunio Esumi et. al., "Mixed Colloidal Dispersions of Silica and Hematite," The Chemical Society of Japan, Bulletin 61, 2287-2290, 1988.

Figure 6:
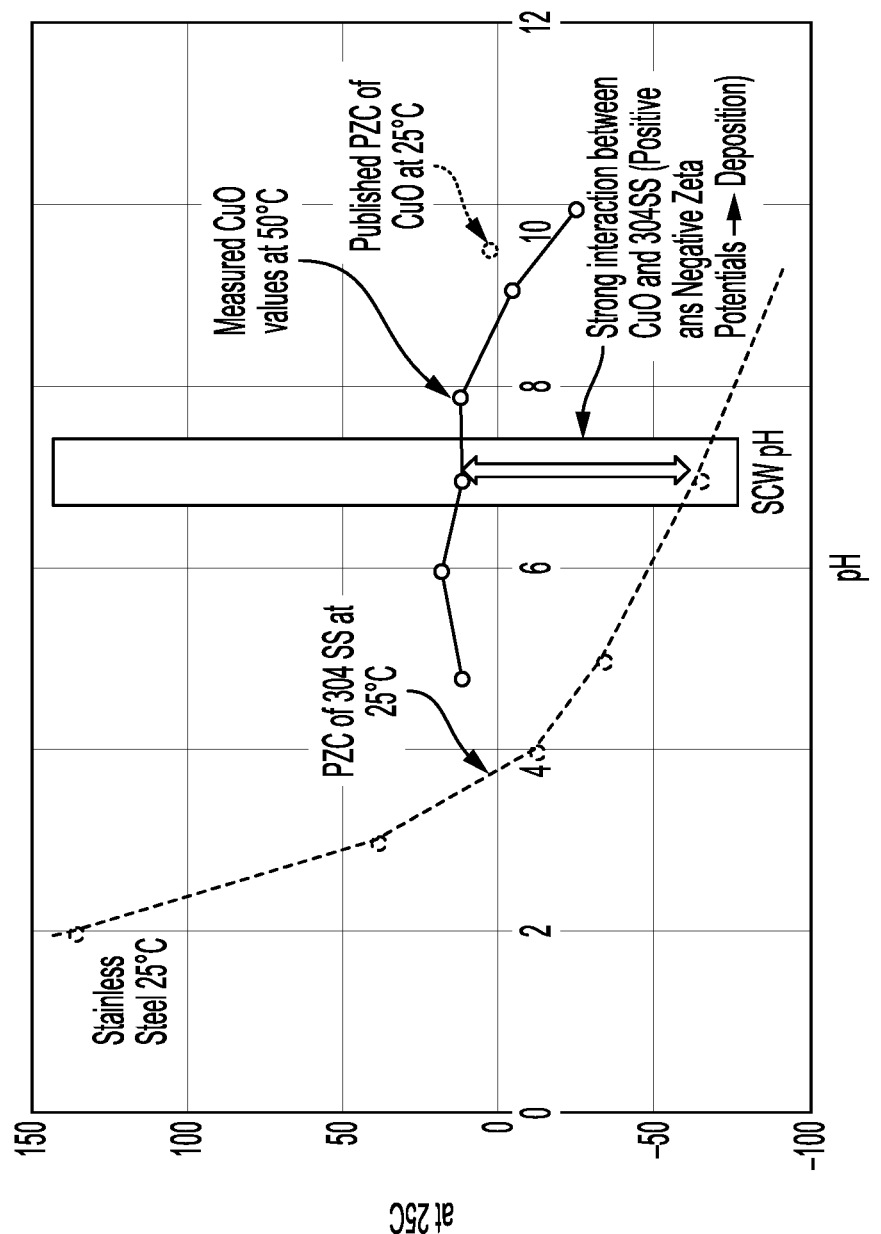
FIG. 6 shows a plot of zeta potentials of 304 stainless steel and CuO exemplifying deposition of CuO on stainless steel due to zeta potentials with opposing signs (surface charges).

Cupric Oxide (CuO):

Results of CuO zeta potential measurements at 50° C. (122° F.) are shown in FIG. 6 along with published 304SS zeta potential values at approximately 25° C. (77° F.) as a function of pH. See B. Levy and A. R. Fritsch, J. Electrochem. Soc., Vol 106, p. 730, 1959. Zeta potential data for CuO were previously not available. However, pzc (point of zero charge) data are available for CuO (pzc of CuO=9.5 at 25° C.) in the literature. G. A. Parks, Chemical Review, Vol 65, Page 177, 1965.

The results support copper oxide deposition on stainless steel surfaces. FIG. 6 also shows the SCW pH zone as a grey bar around pH 7. At this SCW operating pH zone, the zeta potential of 304SS is negative and that of CuO is positive. Therefore, a strong electrostatic interaction between 304 SS and copper oxide is expected at this pH range as shown by the double arrow, making CuO deposition on 304SS feasible as experienced in SCW systems. Thus, the principle of zeta potential can explain why copper oxide deposits on 304 SS surfaces.

The results in FIG. 6 show that CuO would have the same sign of zeta potential as copper metal surfaces at the SCW operating pH. These results confirm that CuO deposition is not expected on any copper materials or their alloys such as Monel (Ni/Cu alloy), Brass (Zn/Cu alloy), or Cupronickel (Cu/Ni alloy), for example. SCW strainers made from any of these metals or alloys or coated with any such metals or alloys are expected to inhibit copper oxide fouling based on the zeta potential principle.

Those skilled in the art will recognize, or be able to ascertain using routine experimentation, equivalents to the embodiments of the systems and methods described herein. Such equivalents are intended to be encompassed by the following claims.

What is claimed is:

1. A method of reducing copper fouling in a stator water cooling (SWC) system, the method comprising: a) identifying a component of the SWC system that is susceptible to fouling by a copper oxide, the component of the SWC system being a strainer comprising stainless steel; and b) applying an anti-fouling metallic material comprising Monel, Brass, Cupronickel, or a combination thereof, to the surface of the component identified in step (a), thereby reducing copper fouling of the component.

2. The method of claim 1, wherein at a SWC system operating pH and temperature, the zeta potential of the anti-fouling metallic material has the same sign as the zeta potential of a fouling copper oxide that forms during operation of the electrical power generator.

3. The method of claim 2, wherein the copper oxide is cuprous oxide ($Cu_2O$), cupric oxide (CuO), or a combination thereof.

4. The method of claim 1, wherein the anti-fouling metallic material is plated onto the component identified in step (a).

5. The method of claim 4, wherein plating comprises electroplating.

6. The method of claim 4, wherein plating comprises electrolessplating.

7. The method of claim 1, wherein the anti-fouling metallic material has a thickness of from about 10 μm to about 100 μm after being applied to the surface of the component identified in step (a).

8. The method of claim 1, wherein the anti-fouling metallic material is applied to substantially all of the surface of the component identified in step (a).

* * * * *